United States Patent [19]

Miller

[11] 3,847,036
[45] Nov. 12, 1974

[54] METHOD OF PRODUCING CUTTING PLATES FOR DIE CUTTING OPERATIONS

[75] Inventor: Orville C. Miller, St. Louis, Mo.

[73] Assignee: Centenary Central, Inc., St. Louis, Mo.

[22] Filed: Oct. 10, 1973

[21] Appl. No.: 405,073

[52] U.S. Cl............................................... 76/107 C
[51] Int. Cl............................................. B21k 5/20
[58] Field of Search............ 76/107 R, 107 A, 107 C

[56] References Cited
UNITED STATES PATENTS

| | | | |
|---|---|---|---|
| 2,685,805 | 8/1954 | Baumgartner...................... | 76/107 C |
| 3,343,430 | 9/1967 | Haas et al.......................... | 76/107 R |
| 3,396,620 | 8/1968 | Raphael et al.................... | 76/107 C |
| 3,535,955 | 10/1970 | Otto et al........................... | 76/107 C |
| 3,696,480 | 10/1972 | Sauer et al....................... | 76/107 C X |

Primary Examiner—Harrison L. Hinson
Attorney, Agent, or Firm—Rogers, Ezell & Eilers

[57] ABSTRACT

This invention relates to a method for producing cutting and creasing plates used in die cutting operations which plates generally comprise a hard metal base plate having a raised counter pattern thereon. In accordance with the method of this invention, a first sheet of material from which the counter pattern is to be formed is bonded to a backing sheet, and grooves are formed through the first sheet in accordance with the desired counter pattern. Next, the outer surface of the first sheet is bonded to a surface of a plate. Then the backing sheet is removed from the first sheet and the excess of the first sheet removed from the plate leaving those sections of the first sheet bonded to the plate which define the counter pattern, thus forming a cutting and creasing plate.

10 Claims, 8 Drawing Figures

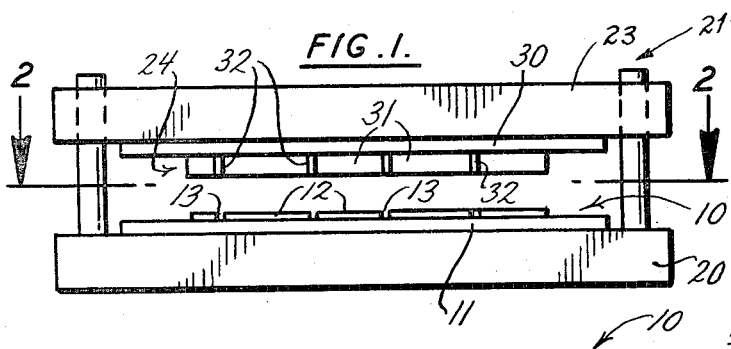
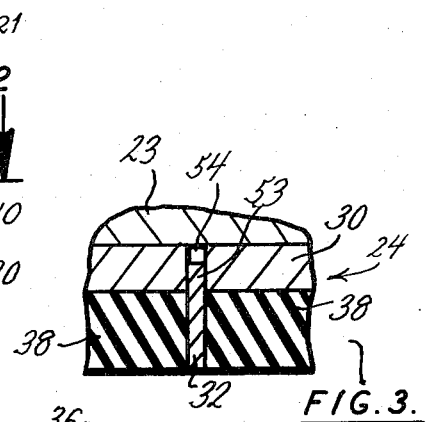
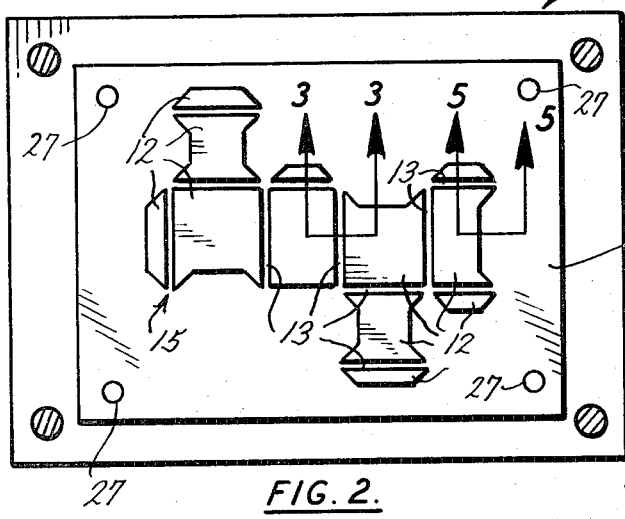
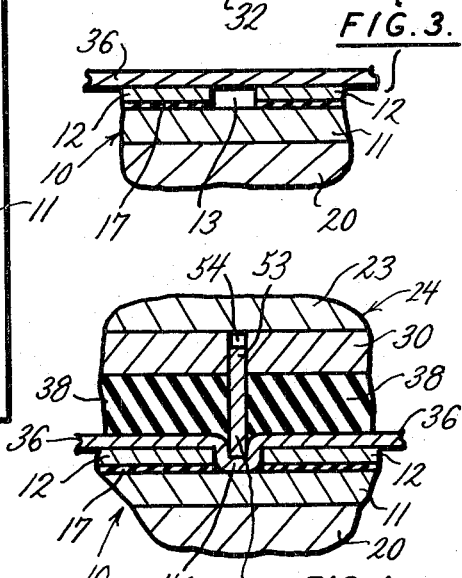
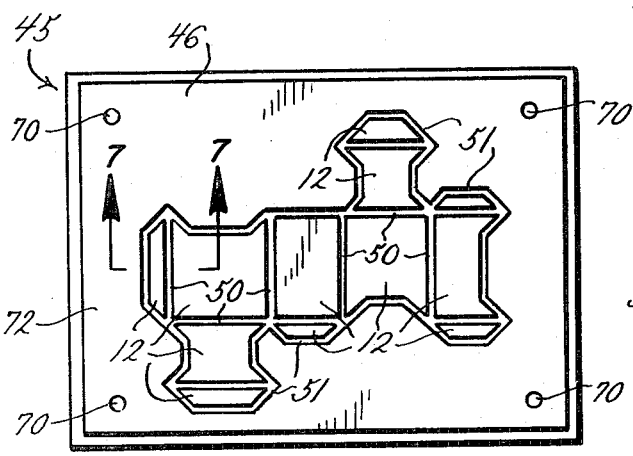
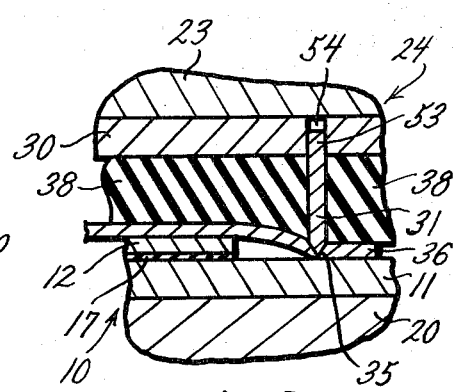
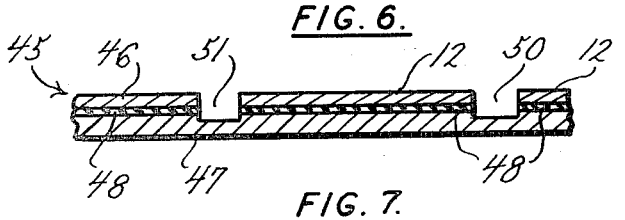

METHOD OF PRODUCING CUTTING PLATES FOR DIE CUTTING OPERATIONS

BACKGROUND AND SUMMARY OF THE INVENTION

This invention relates to an improved method for producing cutting and creasing plates for use in die cutting operations, and particularly such plates which generally comprise a hard metal base plate having a raised counter pattern on one of its surfaces defining a female die pattern. A cutting and creasing plate of this type is used with a mating male die plate which is brought together in registration by a suitable press to thereby produce cuts and/or creases in a sheet material placed therebetween. For example, such a cutting and creasing plate might include a counter pattern for producing box blanks of boxboard having appropriate creases at which the blanks may be folded to form boxes. The method of this invention relates equally to both platen and cylinder presses.

By way of background, one method for producing cutting and creasing plates of this type has been to glue a sheet of hard pressboard onto a hard steel plate or cylindrical drum depending upon whether a platen or cylinder press is used. A die plate having cutting and creasing rule secured thereto in a desired pattern is brought into contact with the pressboard after its cutting and creasing edges have been inked to make an ink impression on the surface of the pressboard in the form of the desired pattern. As an alternative, carbon paper may be used between the die plate and pressboard. Next, channels are cut through the pressboard along the ink marks of a prescribed width, which channels are cut completely through the pressboard down to the steel plate for the creasing rule. The pressboard is cut away for the cutting rule. This cutting operation is done by hand.

The disadvantages of this prior art method is that the hand cutting operation is time consuming and often inaccurate. In this respect it should be noted that the width and depth of the channels which form creases in the boxboard are critical. A channel that is too narrow will cause cracking along the creases in the boxboard, with one that is too wide, the folds of the cartons thus formed are "ropey" and tend to roll from one side to another. With hand cutting, the control of these dimensions is very difficult and great reliance must be placed on the skill of the pressman who makes the cuts.

Another disadvantage of the prior art method is that a relatively soft material, such as pressboard, must be used for the counter so that it can be hand cut in the desired pattern. However, the softness of the counter material also greatly limits the useful life of the cutting and creasing plate to much less than if the counter could be made of a harder material such as metal.

This invention overcomes the problems inherent in the prior art methods and provides a method of producing cutting and creasing plates which are extremely accurate, which can be made quickly and inexpensively, which do not require the expert skill of a craftsman to make, and which are of exceptionally long life.

Generally, in accordance with the method of this invention a metallic sheet, such as of aluminum or other easily milled material, is bonded to a backing sheet to form a counter assembly. Grooves are milled through the aluminum sheet and slightly into the backing sheet to form a pattern that corresponds with a pattern defined by the cutting and creasing rule on a mating male die plate. In a preferred embodiment the grooves in the metallic plate of the counter assembly are cut by a tape controlled milling machine which is also used to locate the cutting and creasing rule in the male die plate, there being means to provide proper registration between the cutting and creasing rule of the die plate and the grooves of the counter assembly. Next, the outer face of the metallic sheet of the counter assembly is bonded in proper registration to the surface of a hard flat metal plate in the case of a platen press, or cylinder in the case of a cylinder press. The backing sheet of the counter assembly as well as the excess of the metallic sheet is then removed leaving only the counter sections on the plate in the desired pattern to form the cutting and creasing plate.

Hence, it is an object of this invention to provide an improved method of producing cutting and creasing plates for die cutting operations.

It is still another object of this invention to provide such a method that eliminates the need to hand cut the pattern for the cutting and creasing plate, and that further provides a long lasting and highly precision cutting and creasing plate both quickly and inexpensively, and therefore one that is superior in these respects to those of the prior art.

These and other objects of the invention will become apparent from the drawing and detailed description to follow.

DESCRIPTION OF THE DRAWING

FIG. 1 is a schematic drawing of a press having a die plate and cutting and creasing plate mounted thereto for die cutting and creasing operations, and illustrating the use of a cutting and creasing plate made in accordance with this invention;

FIG. 2 is a view taken generally along the line 2—2 of FIG. 1 and showing a cutting and creasing plate made in accordance with this invention;

FIG. 3 is an enlarged view in section taken generally along the line 3—3 of FIG. 2 but showing both the die plate and cutting and creasing plate in spaced relation as in FIG. 1 with a sheet of material to be cut and creased therebetween;

FIG. 4 is a view similar to FIG. 3 but with the die and cutting and creasing plates brought together for cutting and creasing;

FIG. 5 is a view in section of the type shown in FIG. 4, but taken generally along the line 5—5 of FIG. 2;

FIG. 6 is a plan view of a counter assembly used in the method of the invention to produce a cutting plate;

FIG. 7 is an enlarged view in section taken generally along the line 7—7 of FIG. 6.

DETAILED DESCRIPTION OF A PREFERRED EMBODIMENT

Figure 8:
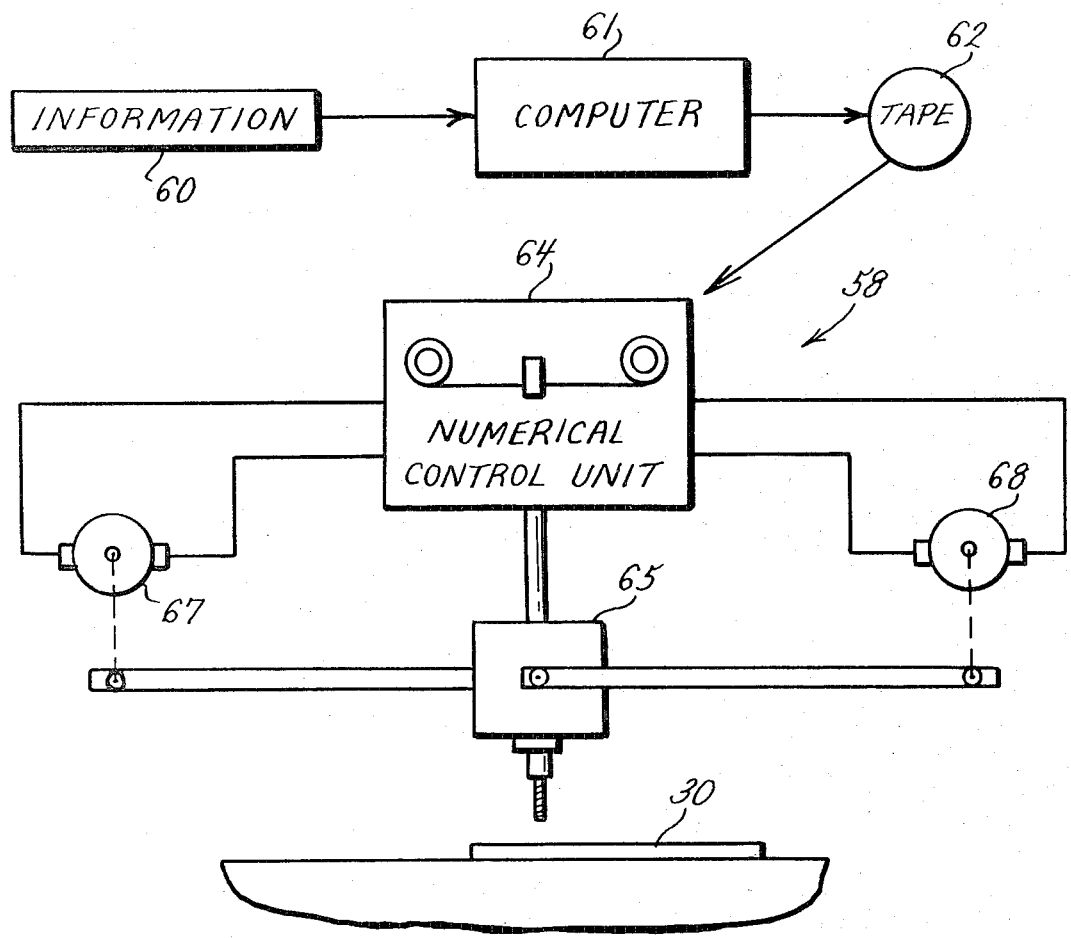
FIG. 8 is a schematic diagram of apparatus for developing a predetermined design on tape for a die assembly, and automatically accurately translating such design through said tape to a die board or counter assembly.

Referring to the drawing and initially FIGS. 1 through 5, there is shown a cutting plate 10 produced in accordance with the method of this invention, which cutting plate comprises a base plate 11 of hard metal such as hard steel, and which may be either flat for use in a platen press or curved for use in a cylinder press. The plate 11 should be of sufficient thickness to be substantially inflexible during the die cutting operation. Thicknesses of between 0.040 and 0.25 inches have been found satisfactory depending on the die cutting operation to be performed.

On the surface of the plate 11 are raised counter sections 12 separated by grooves 13 and which define a counter pattern 15 of a prescribed form. By way of example, the particular pattern 15 shown in FIG. 2 is used to produce carton blanks, the grooves 13 defining the locations of creases where the bank is folded to form a carton or container. It should be understood that while only one pattern 15 is shown, certainly cutting and creasing plates have multiple counter patterns thereon could be used to simultaneously produce multiple blanks. The counter sections 12 are bonded to the plate 11 by an adhesive 17, the cutting plate 10 being produced in accordance with the method to be described.

The thickness of the counter sections depends on the material to be creased; by way of example, a counter section thickness of 0.015 inches may be used for creasing 0.018 boxboard.

The manner in which a cutting plate 10 of the platen type is used in a die cutting operation is illustrated in FIGS. 1 through 5. The cutting plate 10 is mounted to one platen 20 of a press 21. The press 21 has an opposing platen 23 to which a die plate 24 is mounted. The cutting plate 10 and die plate 24 are held in registration by suitable means such as pins or the like (not shown) extending through alignment holes in the die cutting plates such as the holes 27.

The die plate 24 may be made in accordance with the method, and may be of the type disclosed in U.S. Pat. No. 3,696,480 which is incorporated herein by reference, and generally comprises a die board 30 having cutting rule 31 and creasing rule 32 secured thereto in a selected pattern that corresponds with the counter pattern 15. The cutting rule extends around the periphery of the pattern and has a cutting edge 35 (FIG. 5) designed to cut through a sheet of material 36 to be die cut. Creasing rule 32 is located in those areas corresponding to the grooves 13 of the counter pattern 15, the creasing rule 32 being somewhat shorter than the cutting rule 31.

A resilient material 38 is bonded to the surface of die board 30 adjacent to the cutting rule 31. It is used to strip the material 36 off the cutting rule 31.

Hence, in operation the sheet of material 36 to be die cut, such as boxboard or the like, is placed in the press 21 between the plates 10 and 24. The platens of the press are brought together such that the cutting rule 31 cuts through the material 36 by contacting the metal plate 11, thus severing the material 36 (FIG. 5). At the same time the creasing rule 32 presses portions of the material 36 overlying the grooves 13 into the grooves to form creases 40 in the material at the location of the grooves (FIGS. 3 and 4). Because the creasing rule 32 is shorter than the cutting rule 31, and because it has a relatively dull edge compared to the cutting rule 31, the material 36 is merely creased and not cut at those locations.

In accordance with this invention, the cutting plate 10 is produced by first producing a counter assembly 45 shown in FIGS. 6 and 7. The counter assembly 45 comprises a sheet 46 from which the counter sections 12 are ultimately made and for this reason it is preferred that the sheet 46 be made of a durable material such as a metal that can be easily milled. For example, it has been found that aluminum works very well for this purpose. The sheet 46 is bonded to a backing sheet 47 by means of suitable adhesive 48. The backing sheet 47 should be of sufficient thickness and made of any suitable material that will provide sufficient support to hold the sections 12 in fixed relative position after the milling operation to be described. Formica of a minimum thickness of about one-sixteenth inch has been found to work quite well for this purpose.

With the sheet 46 bonded to the sheet 47, grooves 50 and 51 are milled completely through the sheet 46 and slightly into but not all the way through the sheet 47. The pattern of the grooves 50 is identical to the pattern of the creasing rule 32 of the die plate 24. The pattern of the outer perimeter grooves 51 is made to stay approximately a minimum of one-eighth inch inside the cutting rule 31 of the die plate 24. This allows the cutting rule 31 to cut the material 36 without bending over the edge of the cut.

In a preferred embodiment, the grooves 50 and 51 are milled into the sheet 46 using the tape controlled milling operation described in above-referenced U.S. Pat. No. 3,696,480 for mounting the rules 31 and 32 to the die board 30. In accordance with that patent, the rules 31 and 32 have a series of tangs 53 along their entire lengths that fit into holes 54 which are drilled in the die board 30 in a pattern defined in accordance with a tape controlled drilling and milling machine 58 as shown schematically in FIG. 8.

Referring to FIG. 8 information 60 covering the required design is fed into a properly programmed computer 61, which translates the information and produces a drilling tape 62. The drilling tape 62 can be made, other than by computer, such as the programming procedure recommended and published by the Superior Electric Company, Bristol, Connecticut, for its SLO-SYN Numerical Tape Control. However, this would be very time consuming and expensive. A numerical control unit 64 receives the drilling tape 62 and translates the information thereon to the necessary electrical impulses to actuate electrical elements in accordance therewith. Such impulses may energize a traversing supported drill head 65 to automatically bore sequential holes 54 in the properly supported die board 30, and cooperatively energize motors 67 and 68 operatively connected to the drill head 65 for traversing the drill head 65 lengthwise and widthwise, respectively, of the die board. The tangs 53 of the cutting and creasing rules 31 and 32 are mounted in the worked die board 30, as illustrated, thereby providing a die plate ready for mounting in the press 21.

If rather than flat die boards, arcuate die boards for use in a cylinder press are to be worked, the motor 68 may instead by employed to rotate an arcuate base on which the arcuate die board may be mounted.

This same tape controlled system may be used to mill the grooves 50 and 51 in the counter assembly 45. This is accomplished by simply replacing the die board 30 with the counter assembly 45 and using a tape, produced by the same computer to mill the grooves, with means being provided such as holes 70 and suitable pins to ensure registry between the rule pattern of the die plate 24 and the groove pattern of the counter assembly 45.

After the grooves 50 and 51 are formed, the outer surface 72 of the sheet 46 is bonded as at 17 to the surface of the plate 11 such that registry is maintained between the alignment holes 27 and 70. After the adhesive 17 has firmly set, the backing sheet 47 is first removed followed by the excess of the sheet 46 to leave only the counter sections 12 bonded to the plate 11, thus forming the cutting and creasing plate 10.

The adhesive 17 used between the sheet 46 and plate 11 should provide a stronger bond than the adhesive 48 between the sheet 46 and the backing sheet 47, so that after the counter assembly 45 is bonded to the plate 11, the backing sheet 47 can be removed without affecting the bond between the sheet 46 and plate 11. By way of example, it has been found that for the adhesive 17, Scotchgrip Contact Cement No. 2210 may be used. Both the top surface 72 of the sheet 46 and the surface of the plate 11 are first coated with the contact cement which is allowed to dry about ten minutes until it is no longer tacky to the touch. Then the cemented surfaces of the plates 46 and 11 are brought together in proper registration and the cement allowed to set. For bonding the sheet 46 to the backing sheet 47 it has been found that 3M No. 77 spray adhesive may be used. The adhesive is sprayed to both the sheet 46 and the sheet 47, the sprayed surfaces are brought together and the adhesive allowed to dry for two to ten minutes.

Hence, there has been described an improved method for producing a cutting and creasing plate for use in die cutting operations, and which produces a cutting and creasing plate of superior quality and with less time and skill required, and which otherwise fulfills the objects heretofore described.

Various changes and modifications may be made in this invention, as will be readily apparent to those skilled in the art. Such changes and modifications are within the scope and teaching of this invention as defined by the claims appended hereto.

What is claimed is:

1. A method of producing a cutting and creasing plate having a counter pattern thereon for die cutting operations comprising the steps of bonding a first sheet from which the counter pattern is to be formed to a backing sheet, forming grooves in the first sheet in accordance with the desired counter pattern, which grooves extend completely through the first sheet but not completely through the backing sheet, bonding the outer surface of the first sheet to a surface of a plate after the grooves are formed, and removing the backing sheet from the first sheet and the excess of the first sheet from the plate after the second bonding step leaving those sections of the first sheet bonded to the plate which define the counter pattern to form a cutting and creasing plate.

2. The method of claim 1 wherein the first sheet is metal.

3. The method of claim 1 wherein the first sheet is aluminum.

4. The method of claim 1 wherein the cutting plate is flat.

5. The method of claim 1 wherein the cutting plate is arcuate.

6. The method of claim 1 wherein the bond between the first sheet and the plate is stronger than the bond between the first sheet and the backing sheet.

7. The method of claim 1 wherein the groove forming step further comprises cutting the grooves in response to a tape controlled input defining the groove pattern.

8. The method of claim 1 wherein the grooves are cut partially into the backing sheet.

9. The method of claim 1 wherein each of the bonding steps further comprises applying adhesive to the surfaces to be bonded, pressing these surfaces together, and allowing the adhesive to set to form the bond.

10. The method of claim 1 wherein the plate is made of hard steel.

* * * * *